Dec. 29, 1925.

H. R. RICARDO 1,567,986

CRANK SHAFT

Filed Dec. 8, 1922    2 Sheets-Sheet 1

INVENTOR
Harry Ralph Ricardo
BY
Watson, Cost, Morse & Grindle
ATT'YS.

Dec. 29, 1925.

H. R. RICARDO 1,567,986

CRANK SHAFT

Filed Dec. 8, 1922    2 Sheets-Sheet 2

INVENTOR
Harry Ralph Ricardo,
BY
Watson, Coit, Morse & Grindle,
ATTYS.

Patented Dec. 29, 1925.

1,567,986

UNITED STATES PATENT OFFICE.

HARRY RALPH RICARDO, OF LONDON, ENGLAND.

CRANK SHAFT.

Application filed December 8, 1922. Serial No. 605,675.

*To all whom it may concern:*

Be it known that I, HARRY RALPH RICARDO, a subject of the King of England, and residing at London, in England, have invented certain new and useful Improvements in Crank Shafts, of which the following is a specification.

This invention relates to crankshafts of the built-up multi-throw type and more especially to those crankshafts which are provided with roller or ball bearings on the journals and crank pins and has for its object to overcome certain difficulties which are experienced in existing constructions of crankshafts of this type.

According to this invention the crank webs are shrunk on to the ends of plain shaft lengths and plain parallel pins constituting crank pins are each carried at their ends in holes in an adjacent pair of webs, the ends of the pins being fixed separately in their respective webs by clamping the webs about the ends of the pins. Hollow shaft lengths are conveniently employed with the holes which extend through them all of uniform size. The clamping of the pins is effected in a manner which permits of the parts readily being taken apart and reassembled and the pins are so carried in the holes formed to receive them in the crank webs that adjustment in the axial direction of the shaft lengths can be effected during assembly. The method of assembly is carried out in the following way. After the webs have been shrunk on to the ends of the hollow shaft lengths, the latter are placed in a jig and threaded on to a try bar so as to bring them into line. Adjacent webs are next brought into line and a plain crank pin passed through the holes in each pair of webs one end of each pin being fixed in the one web by clamping. The parts of the whole crankshaft are next adjusted by movement in the axial direction of each crank pin in the second web so as to determine exactly the overall length of the shaft and the centre to centre distances of the crank throws. Finally the second end of each crank pin is fixed by clamping in the second web. Where ball or roller bearings are employed the bearing member is fixed or formed on the shaft length between the webs and before the latter are shrunk into place on the ends of the shaft length. Where ball or roller bearings are employed at the big end the bearing member is mounted on the crank pin before assembly of the crank shaft or the crank pin itself may be suitably formed to constitute the inner member of the bearing.

The invention may be carried out in practice in various ways but the accompanying drawings illustrate by way of example one construction that may be adopted. In these drawings—

Like letters indicate like parts throughout the drawings.

Figure 1:
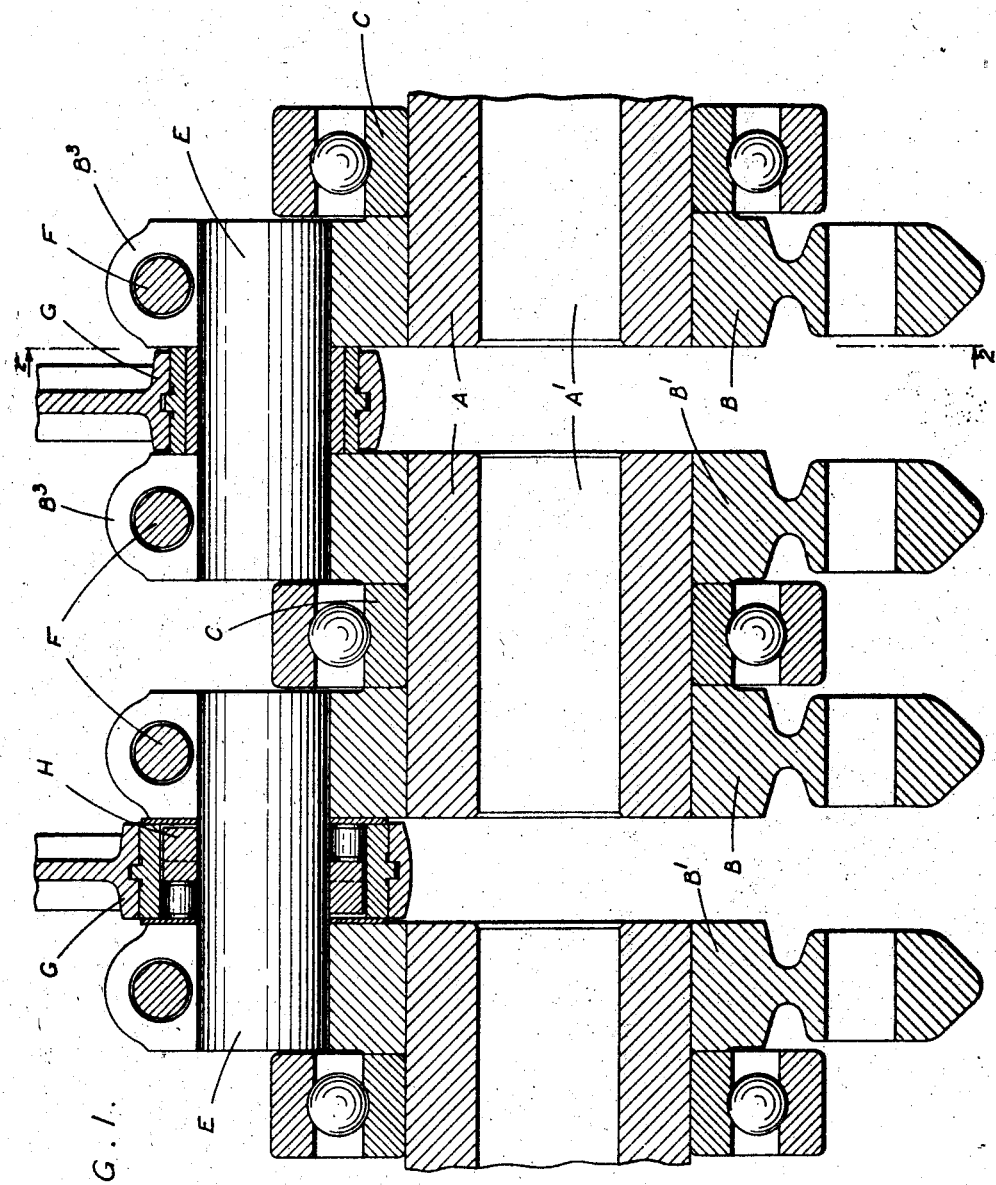
Figure 1 is a longitudinal sectional elevation of a portion of a multi-throw built-up crank-shaft the section being taken through the crank-shaft axis and the axes of two similarly disposed crank pins.

A series of shaft lengths A are provided, each of these for example and as illustrated being similar in diameter and length but the lengths may obviously vary as found convenient. These shaft lengths are hollow and the holes A' extending through them are uniform in diameter. On each shaft length and at one end thereof is shrunk a crank web B and then the inner member C of a ball race is pressed on to the shaft length, the whole ball bearing thus lying next to the crank web B. A second crank web B' is now shrunk on to the other end of each shaft length A so that this web lies next to the ball bearing C. The crank webs B and B' are disposed at such an angle apart about the axis of the shaft length A as may be required in accordance with the number of throws in the whole crankshaft and the relative disposition that is required for the crank pins. For example, in a four-throw crankshaft of the type in which all the throws lie in one plane coincident with the shaft axis, the angle between the crank webs on the ends of certain of the journal pieces will be 180° while in other cases the angle will be 360°, that is to say, the crank webs will be similarly arranged at both ends of the shaft lengths. Figure 1 illustrates two similar cranks in the centre of a four-throw crankshaft which will have the two outside cranks at 180° to the centre cranks.

If desired instead of placing a complete ball race such as C on each shaft length between the crank webs, the shaft length itself may serve as the inner race of the bearing in which case the shaft itself is hardened.

Figure 2:
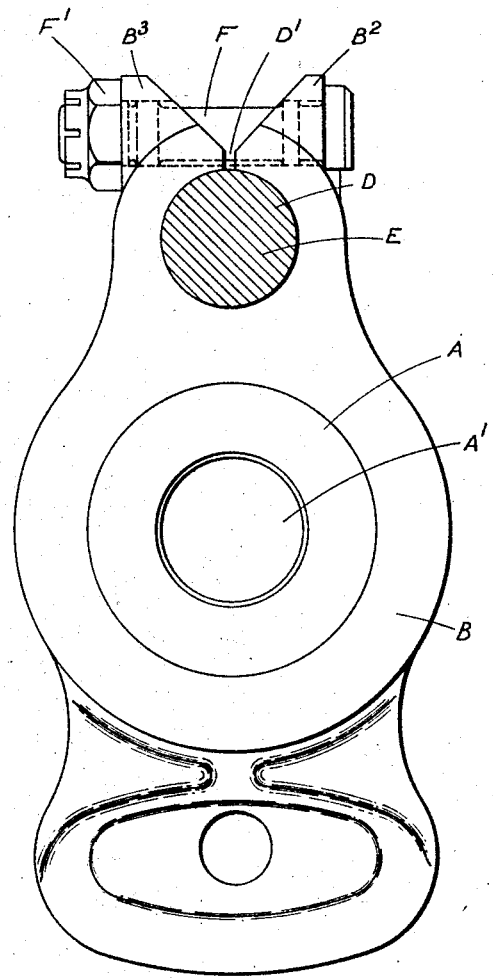
Figure 2 is a transverse section on the line 2—2 in Figure 1.

Each crank web B B' has a hole D formed through it to receive the end of a plain crank pin E. A slit or cut D' is made through the web into the hole D the web being formed into lugs as at B² B³ on either side of the slit D' as shown in Figure 2. A hole extends through these lugs in a direction transverse to the axis of the hole D for the crank pin and a bolt F is passed through these holes so that when the nut F' on this bolt is tightened up the two lugs B² B³ will be drawn together and the parts of the web around the hole D will be clamped on to the crank pin E.

In assembling a multi-throw crankshaft several shaft lengths are placed in a suitable jig and a try bar is passed through the holes A' in all of these unit portions of the crankshaft all the shaft lengths in this way being brought truly into line. Adjacent webs B and B' on separate shaft lengths are now brought into line and a crank pin E together with its connecting rod big end bearing (if of the roller bearing or plain floating bush type) mounted on it is passed through the holes D in the webs. One end of the crank pin is now clamped for example in the web B by tightening up the nut F' on the bolt F while the other end of each crank pin is still free to slide through the hole D in the adjacent crank web B'. By rotating or oscillating the whole crankshaft in the jig while the try bar is still in position the several parts of the crankshaft are free to adjust themselves to the desired overall length and centre to centre distance of th crank throws. Having ascertained that the respective crank throws have taken up their proper positions in the length of the crankshaft the second end of each crank pin E is clamped in its web B' by tightening up the nut F' on the bolt F.

Each crank pin is now ready to receive the big end G if the bearing at the big end is of normal type. In some cases, however, the big end bearing may take the form of a complete roller or ball bearing which is then placed upon the crank pin E while the parts are being assembled or it may take the form of a floating bush running between a hardened steel crank pin and a hardened outer ring as shown in Figure 1 (right hand crank). Alternatively the crank pin may itself be hardened and adapted to form the inner race of a ball or roller bearing as shown in the left hand crank in Figure 1. The outer race of the bearing H is then formed either as a separate piece held in a split big end or, as shown in Figure 1, the unsplit big end G' may form the outer race of the bearing.

A crankshaft constructed as above described will lend itself to the use of roller bearings for journals and crank pins and at the same time provides a crank-shaft which is easy to assemble and in which repairs can easily be carried out. It has been found that adequate connection can be obtained by shrink fits of the webs B and B' on the crank-shaft lengths A to transmit the torque coming on these parts without having to raise the temperature to a degree which will draw the hardness of the shaft lengths when these are designed to act as the inner races of the bearings.

As the crank pin of a crankshaft which is supported by intermediate bearings between each throw is not subjected to torsion, if it is assumed that there is adequate stiffness in the bearing supports, it is unnecessary to provide a fixing for the crank pins which shall be capable of transmitting torsion. The requirement with regard to the fixing of each crank pin E in the webs B B' is therefore solely that the pin shall be well supported to take bending stresses and this end is attained with the construction described above.

The details of construction may be modified as found desirable in accordance with the type of crankshaft that may be required and the purpose for which it is to be used.

What I claim as my invention and desire to secure by Letters Patent is:—

A built-up crank shaft comprising a plurality of aligned shaft sections having smooth cylindrical bearing surfaces at their ends respectively, a flat metallic web member at each end of each shaft section provided with two cylindrical apertures extending therethrough, the axes of said apertures being parallel, one aperture of each web having a continuous cylindrical wall shrunk on to the cylindrical end bearing surface of the corresponding shaft section, and the other aperture of each web constituting a crank pin aperture having a relatively thin wall slotted in such manner that the diameter of the aperture may be reduced by bolts or clamps, crank pins extending parallel to the shaft axis and having smooth cylindrical outer surfaces, the ends of said crank pins lying within the aligned crank pin apertures of two adjacent web members, and a clamping bolt associated with each web by means of which each crank pin aperture is reduced in diameter to tightly clamp the corresponding crank pin end, the clamping bolt being adapted to be readily loosened to permit individual removal of the crank pins.

In testimony whereof I have signed my name to this specification.

HARRY RALPH RICARDO.